(12) United States Patent
Calzada et al.

(10) Patent No.: US 8,739,692 B2
(45) Date of Patent: Jun. 3, 2014

(54) CHICKEN RING COOKING DEVICE AND METHOD

(75) Inventors: Manuel Calzada, Rolling Meadows, IL (US); Henry T. Ewald, Roselle, IL (US); Paul G. Simmons, Glen Ellyn, IL (US)

(73) Assignee: Restaurant Technology, Inc., Oak Brook, IL (US)

( * ) Notice: Subject to any disclaimer, the term of this patent is extended or adjusted under 35 U.S.C. 154(b) by 112 days.

(21) Appl. No.: 12/072,339

(22) Filed: Feb. 26, 2008

(65) Prior Publication Data

US 2009/0214736 A1    Aug. 27, 2009

(51) Int. Cl.
*A47J 37/06*    (2006.01)

(52) U.S. Cl.
USPC ................................... 99/349; 99/425

(58) Field of Classification Search
CPC ....... A21C 11/006; A21C 9/083; A23P 1/105
USPC ........... 99/349, 645, 339, 340, 345, 347, 440, 99/422, 425, 426, 352, 428, 330, 467, 474, 99/448, 449, 450, 475, 444, 446, 404, 405, 99/406, 410; 219/401, 400, 440, 525, 730
See application file for complete search history.

(56) References Cited

U.S. PATENT DOCUMENTS

| | | | | |
|---|---|---|---|---|
| 2,656,946 | A | * | 10/1953 | Clarke ...................... 220/592.2 |
| 4,184,421 | A | | 1/1980 | Ahldren |
| 4,320,699 | A | * | 3/1982 | Binks ............................ 99/349 |
| 4,488,479 | A | * | 12/1984 | Sloan et al. ..................... 99/345 |
| 4,512,250 | A | * | 4/1985 | Schindler et al. ............... 99/425 |
| 5,465,654 | A | * | 11/1995 | Lampi et al. .................... 99/422 |
| 5,501,142 | A | | 3/1996 | Bailey |
| 5,780,817 | A | * | 7/1998 | Eckman et al. .......... 219/452.12 |
| 6,026,736 | A | | 2/2000 | Turner |
| 6,053,095 | A | | 4/2000 | Ting |
| 6,065,393 | A | | 5/2000 | Lombard et al. |
| 6,216,586 | B1 | | 4/2001 | Burgin |
| 6,229,131 | B1 | | 5/2001 | Koochaki |
| 6,307,193 | B1 | | 10/2001 | Toole |
| 6,487,964 | B2 | | 12/2002 | Snoke et al. |
| 6,595,115 | B1 | * | 7/2003 | Lin ................................ 99/342 |
| 7,059,318 | B2 | | 6/2006 | Cornfield |
| 7,104,187 | B1 | | 9/2006 | Robinson |
| 2002/0129714 | A1 | * | 9/2002 | Lee et al. ........................ 99/403 |
| 2003/0021988 | A1 | * | 1/2003 | Tannenbaum ............... 428/336 |
| 2004/0050379 | A1 | * | 3/2004 | Kuttalek ...................... 126/1 R |
| 2006/0213373 | A1 | * | 9/2006 | Fernandez et al. .............. 99/349 |

OTHER PUBLICATIONS

International Searching Authority, International Search Report and Written Opinion, International Application No. PCT/US09/001145, Apr. 20, 2009.

* cited by examiner

*Primary Examiner* — Henry Yuen
*Assistant Examiner* — Phuong Nguyen
(74) *Attorney, Agent, or Firm* — Hinshaw & Culbertson LLP (57) ABSTRACT

A commercial cooking apparatus is provided for simultaneous steaming and two-sided grilling of food items having non-uniform thickness and/or variations in nominal thickness. The apparatus includes a compressible, heat-resistant ring member, and optionally a flexible, non-stick, heat-resistant film material associated with the ring member to form a cavity defined by the inner perimeter of the ring member. A cooking method is also disclosed, wherein a food item and a quantity of water are introduced into the cavity, and the food item is simultaneously cooked by the heated upper and lower platens of a conventional clamshell grill or similar apparatus and by steam generated by heating the water.

14 Claims, 12 Drawing Sheets

CHICKEN RING COOKING DEVICE AND METHOD

FIELD OF THE INVENTION

The present invention relates to cooking devices and methods of cooking food items, and more particularly to cooking food items having non-uniform thickness and variations in nominal thickness, on conventional clamshell grills or similar appliances.

BACKGROUND OF THE INVENTION

Food items of non-uniform thickness can present problems for uniform and efficient cooking, particularly for a commercial restaurant where large numbers of such food items need to be cooked efficiently and uniformly.

Enclosures adapted for simultaneous steaming and grilling of such food items on a platen surface have been employed. In particular, it has been known to cook one or more food items on a heated platen located under an enclosure assembly having a cover, with a small water container mounted on the cover for dripping water onto the platen surface. The water produces steam, which cooks the thinner portions of the food items not in direct contact with the heated platen. However, such an assembly is only adapted for one-sided grilling, and so the food items must be turned over typically about halfway through the cooking process to permit grilling on the opposite side. This method of cooking such food items requires substantial labor and time.

An efficient, practical and economical device and method for the simultaneous steaming and two-sided grilling, such as on a clamshell grill, of food items, including those that have substantial variations in thickness, and of food items having variations in nominal thickness from one food item to another is needed.

A need exists for a cooking device and method for simultaneous steaming and two-sided grilling on a flat platen grill of food items having non-uniform thickness and variations in nominal thickness from one food item to the next.

BRIEF SUMMARY OF THE INVENTION

In accordance with one aspect of the invention, an apparatus for heating and/or cooking a food item having a non-uniform thickness is provided. As used herein, unless otherwise specified, the term "cooking" includes heating a food product that has been previously cooked. The apparatus includes a compressible, heat-resistant ring member that defines an inner perimeter which surrounds an area sufficient to contain a food item to be cooked. The apparatus may further include a flexible, non-stick, heat-resistant film material associated with the ring member to form a cavity within the inner perimeter of the ring member. A food item can be placed on top of the flexible, non-stick, heat-resistant film material within the cavity. The film material may be a single sheet of material. The film material defines, in conjunction with the ring member, a cavity within the inner perimeter of the ring member. The film material may comprise an upper and lower sheet wherein the lower sheet defines the lower portion of the cavity within the inner perimeter of the ring member, thereby defining a volume into which a food item or items can be placed. The upper sheet may be associated with the ring member in a variety of ways. For example, the upper sheet may be draped over the ring member. Alternatively, the upper sheet of the film material may be mounted to a heated upper platen of, for example, a clamshell grill type apparatus.

Typically, it is desirable that the cavity in conjunction with the upper platen of a clamshell grill type apparatus will be able to retain water and steam created by heating water contained in the cavity, such as up to a pressure of from about 0.5 to about 3.0 psig (pounds per square inch gauge pressure) and any value or range in that range, including, for example, 1 psig, a range of about 0.75 to about 1.5 psig and 2 psig.

The outer material of the heat-resistant ring member may be the same or different from the internal material of the ring member. The outer surface of the ring member may be a non-stick heat-resistant material.

The ring member may be made in whole or in part of high temperature resistant silicone rubber or a material such as PTFE (polytetrafluoroethylene).

In accordance with another aspect of the present invention the ring member is a solid unitary compressible body. In another embodiment, the ring member may include a compressible sleeve around a metal core. In still another embodiment, the ring member may comprise a hollow compressible tube.

In accordance with another aspect of the present invention, the apparatus may include only a compressible, heat-resistant ring member. Typically, such a ring member will have a compressibility in the operating height range (uncompressed height to compressed height when cooking food) in the range of from about 10% to about 50% height reduction per 2 pounds per square inch of compression force applied to the ring member. While the uncompressed height of the ring member can be as desired, a typical height range for many cooking food items, such as boneless chicken breasts, will be in the range of from about 1½ to about ⅜ inches. In addition, the ring member may be solid or hollow.

Typically, the ring member is formed of compressible, heat-resistant material. In one embodiment, the ring member may comprise a sleeve of compressible, heat-resistant material that is disposed around a core metal ring. In accordance with another embodiment, the ring member comprises a tube of compressible heat-resistant material and may have either a solid or a hollow core. The ring member can have a cross-sectional shape as desired, and may be, for example, generally circular, oval, rectangular, octagonal or triangular.

In accordance with still another aspect of the present invention, a method for the simultaneous steaming and grilling of a food item having a non-uniform thickness is provided. The food item to be steamed and grilled may be uncooked, partially cooked, completely cooked, frozen, unfrozen, and at any desired initial temperature. Thus, further cooking or heating of an already cooked food item is contemplated. The method includes providing a compressible heat-resistant ring member defining an inner perimeter around an area sufficient to contain the food item to be cooked, covering at least a portion of the ring member with a flexible, non-stick, heat-resistant film material to form a cavity defined by the inner perimeter of the ring member and the flexible, non-stick, heat-resistant film material for containing the food item to be cooked, introducing the food item into the cavity, disposing a bottom face of the ring member and the film material in contact with the heated lower platen, closing the heated upper platen onto a top surface of the ring member and the food item and cooking the food item with heat from the upper and lower heated platens. This results in two-sided and complete cooking of the food item which may have an irregular shape. The method may further include introducing water into the cavity and heating the water with heat from the heated lower platen to produce steam. This can result in the cooking of the entire food item including the portions of the food item that do not receive heat by conduction from the heated platens.

In accordance with another aspect of the method of the invention, the food item and the ring member are compressed to different degrees and the method further includes closing the heated upper platen onto the ring member and the food item to compress the height of the taller of the food item and the ring member to a height less than or equal to the uncompressed height of the shorter of the food item and the ring member. Typically, the uncompressed height of the ring member may be greater than the uncompressed height of the food item, and when compressed, the height of the ring is equal to or less than the maximum height of the compressed food item. This is because some food items have an irregular height and/or are relatively uncompressible to a significant degree, whereas the compressibility of the compressible ring member can be as desired by selecting an appropriate material or materials for construction of the compressible ring member.

In accordance with one aspect of the present invention an apparatus for simultaneous steaming and two-sided grilling of a food item having non-uniform thickness includes a compressible, heat-resistant ring member and flexible, non-stick, heat-resistant film material associated with the ring member to form a cavity for cooking the food item between heated upper and lower platens of a clamshell grill or similar apparatus. The film material may be a polymeric sheet material comprising PTFE, which may be pure or manipulated PTFE, typically having a thickness of about 0.0045 inches or less. More typically, the film material is a gas-permeable and liquid-impermeable material which may be expanded or dispersion-polymerized PTFE. The film material may be in the form of a single sheet or two or more sheets, and preferably covers the top and/or bottom face of the ring member. A bottom sheet may define a volume containing the ring member or defined within the inner perimeter of the ring member. A top sheet may be mounted to the upper platen. Preferably, the cavity is adapted to hold water, and when the upper platen is closed onto the apparatus, the cavity preferably retains steam.

In accordance with yet another aspect of the present invention, a method of cooking a food item having non-uniform thickness includes introducing a food item into the cavity of a compressible ring member in accordance with the present invention disposed in a clamshell grill, closing the upper platen of the clamshell grill, and cooking the food item inside the cavity. The method may further include providing the compressible ring member having a height greater than the height of the food item, applying a compressive force to the compressible ring member, such as from the upper platen of the clamshell grill in an amount sufficient to reduce the height of the compressible ring member to the maximum height of the food item (which may also be somewhat compressed). The food item can be any type of food, and typically will be a solid or semi-solid, and may be a meat item. Especially preferred types of food items are those having an irregular shape including height, such as a boneless chicken breast, for example.

In accordance with another aspect of a method of the present invention, a quantity of water is introduced into the cavity with the food item. When the cavity is closed, thicker portions of the food item are cooked by contact with the hot platens or film material, and thinner portions are cooked by steam generated by heating the water.

In accordance with another aspect of a method of the present invention, at least the ring member, and preferably both the ring member and the food item, are compressed by a force from the upper platen during heating. Typically, for most types of food, the ring member will be compressed more than the food item, although for foods that are soft or semi-solid the food may be compressed more than the ring member for a given force. In such case, the food item can have a greater uncompressed height than the uncompressed ring member to help ensure two-sided cooking of the food item.

DETAILED DESCRIPTION OF THE INVENTION

Systems for achieving faster and more uniform cooking of food items having non-uniform thickness and/or variations in nominal thickness by simultaneous two-sided grilling and steaming are described in this section. In particular, "chicken ring" cooking systems and methods in accordance with the invention are illustrated in FIGS. 1-22. Although the illustrated embodiments described below relate to systems and methods for cooking chicken breasts, the present invention is not intended to be so limited, and applies equally to systems and methods for heating and/or cooking other food items having non-uniform thickness and/or variations in nominal thickness, such as other cuts or types of meat, mushrooms, vegetable matter or the like, regardless of food type.

Figure 1:
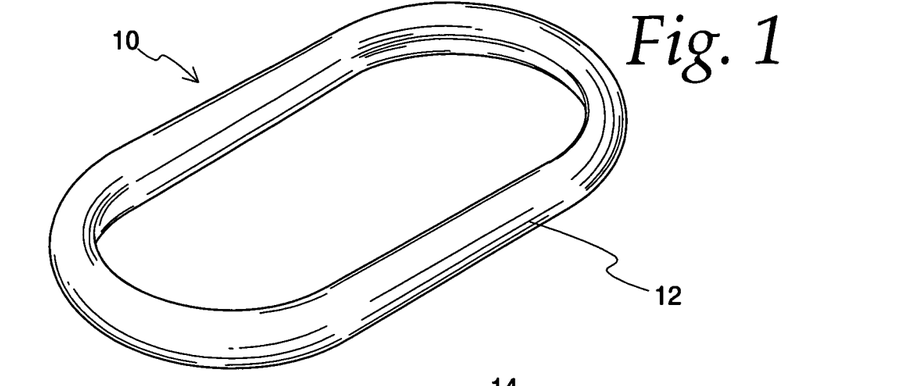
FIG. 1 is a perspective view of a ring member in accordance with the invention.

Referring to FIG. 1, an open (i.e., uncovered) chicken ring 10 in accordance with the present invention is shown. The chicken ring 10 is composed of a compressible ring member 12. In the embodiments illustrated in the Figures, the chicken ring 10 is in the overall general shape of a rectangle with rounded corners, but it will be appreciated that other shapes may be utilized or better suited to the shape of food items to be cooked or other parameters of a particular cooking system. With this understanding, the term "ring" is used to indicate a structure with an outer perimeter and an inner perimeter defining an interior area, but is not intended to be limited to structures having rounded outer and inner perimeters.

Figure 2:
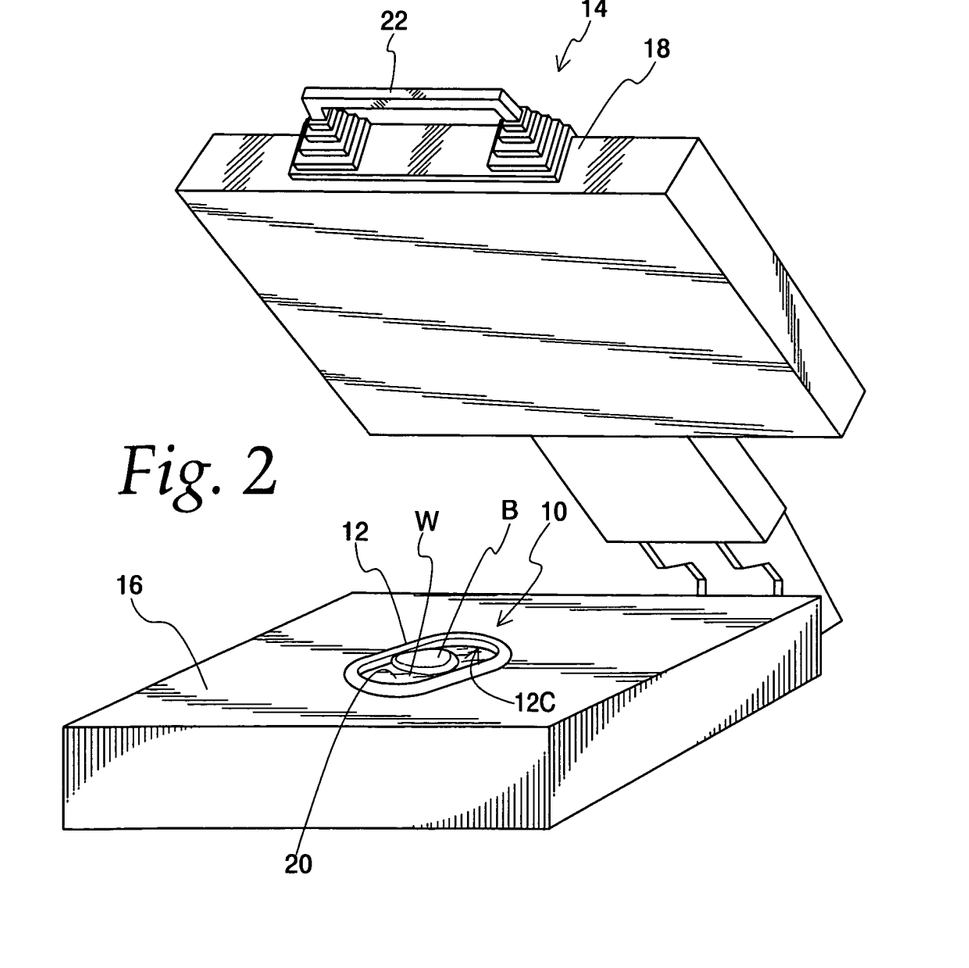
FIG. 2 is a perspective view of the ring member of FIG. 1 disposed on a lower heated platen of a clamshell grill.
Figure 3:
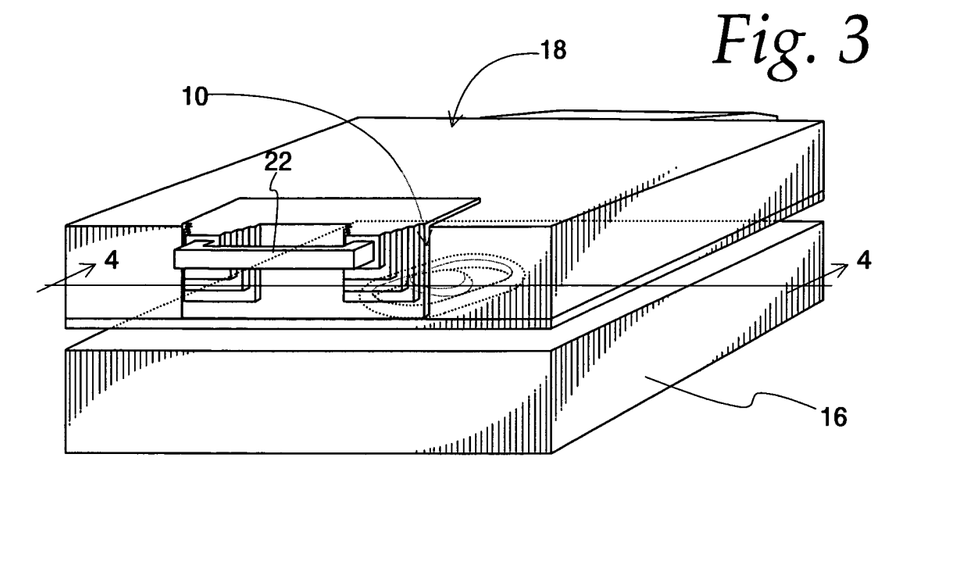
FIG. 3 is a perspective view of a clamshell grill closed onto the ring member of FIG. 1.
Figure 4:
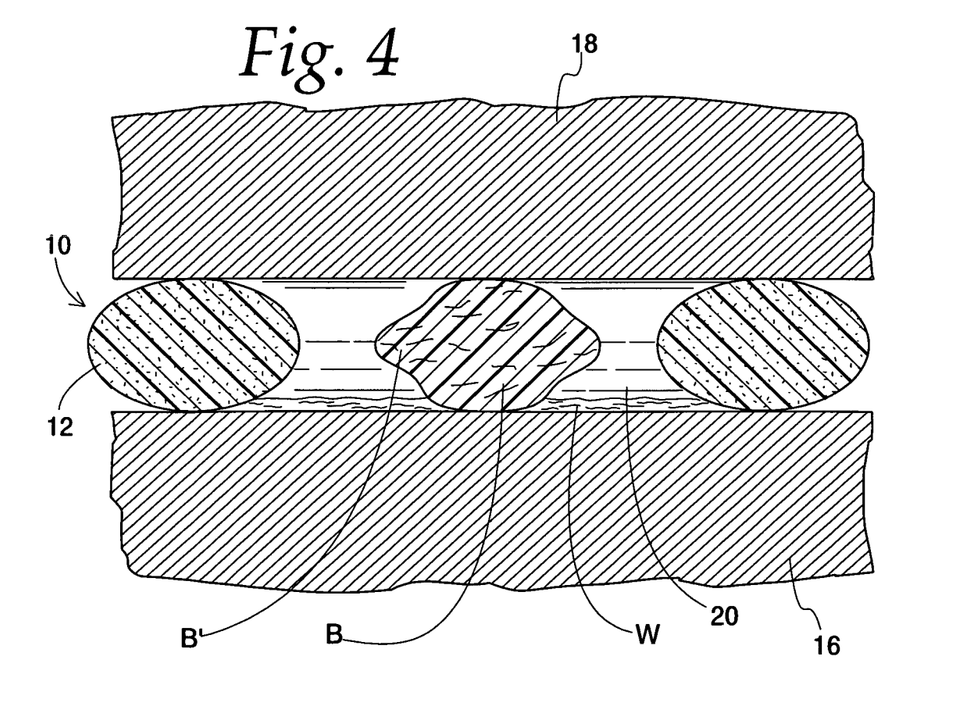
FIG. 4 is a front sectional illustration of a method of cooking a chicken breast in the ring member of FIG. 1 disposed between heated platens of a clamshell grill.

As shown in FIGS. 2-4, open chicken ring 10 may be used to cook a chicken breast B on a conventional clamshell grill 14, having a heated lower platen 16 and a heated upper platen 18. Referring to FIG. 2, ring member 12 may be placed on the surface of heated lower platen 16 to form a cavity 20 defined by inner perimeter 12c of ring member 12. A chicken breast B and quantity of water W may be introduced into cavity 20, in direct contact with heated lower platen 16. Upper platen 18 may then be closed onto ring member 12 and chicken breast B, either manually by using the handle 22, or by automatic device (not shown), such as a motor or hydraulic mechanism, yielding the arrangement shown in FIG. 3. Turning to FIG. 4, a sectional view of the arrangement shown in FIG. 3, one sees that cavity 20 is bounded on all sides by the inner perimeter of ring member 12, and below and above by heated platens 16 and 18. Cavity 20 thus retains steam generated when quantity of water W is heated. This steam cooks thinner portions B' of chicken breast B not in direct contact with either heated platen, while direct heat from the platens grills the thicker portions of chicken breast B from above and below. In this manner, even cooking of chicken breast B may be achieved more quickly than by the known method of simultaneous steaming and one-sided grilling.

In other embodiments, chicken ring 10 covered by flexible, non-stick release sheet material is used to cook chicken breast B on a conventional clamshell grill.

Figure 5:
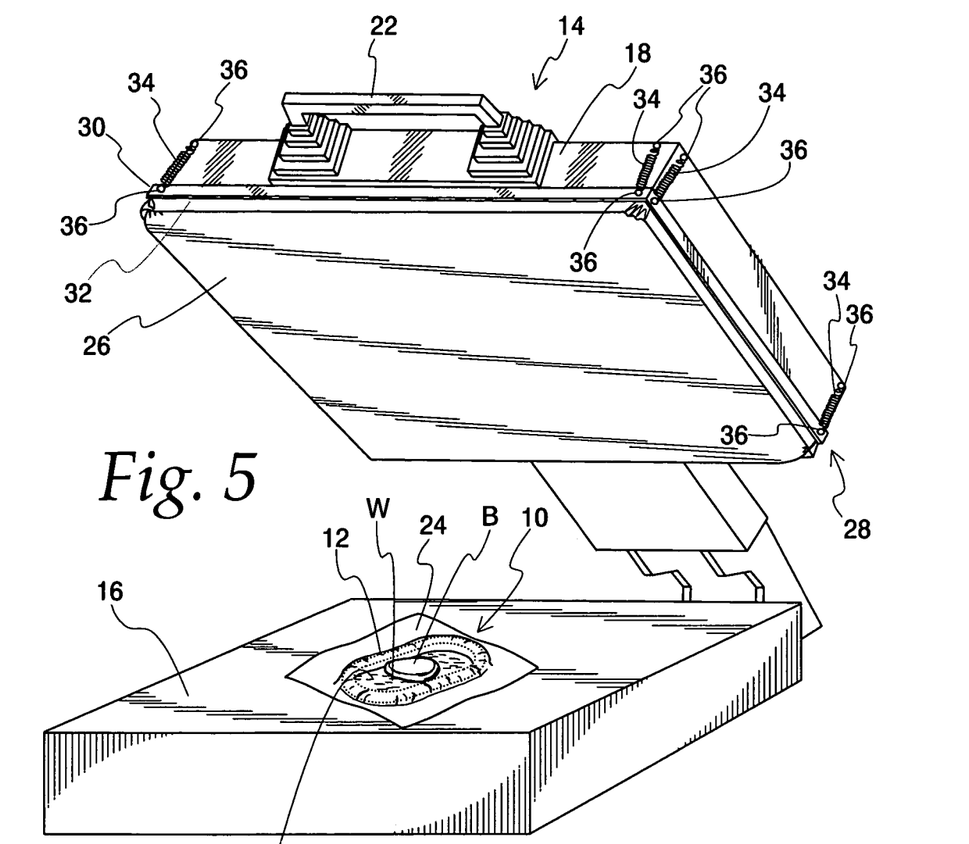
FIG. 5 is a perspective view of the ring member of FIG. 1 covered by a lower release sheet and disposed on the lower heated platen of a clamshell grill, and an upper release sheet mounted to the upper platen of the clamshell grill.
Figure 6:
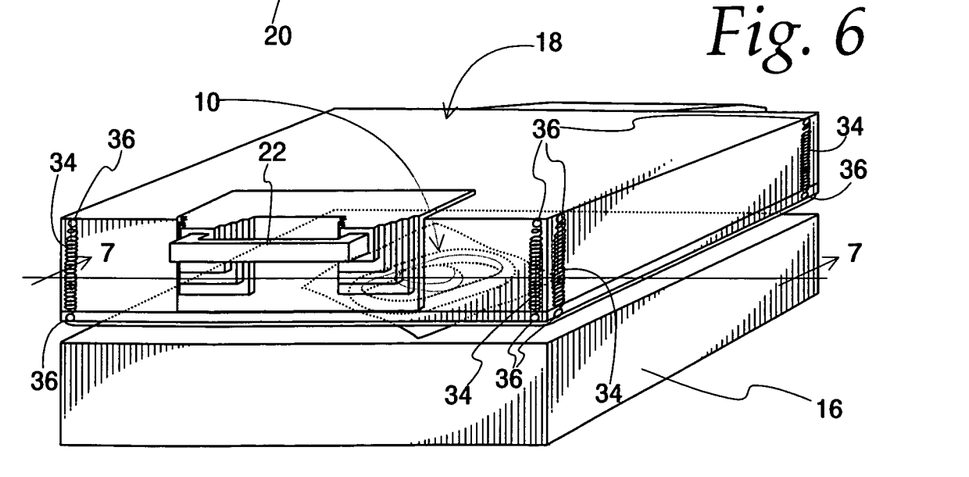
FIG. 6 is a perspective view of a clamshell grill with an upper release sheet closed onto a ring member covered by a lower release sheet.
Figure 7:
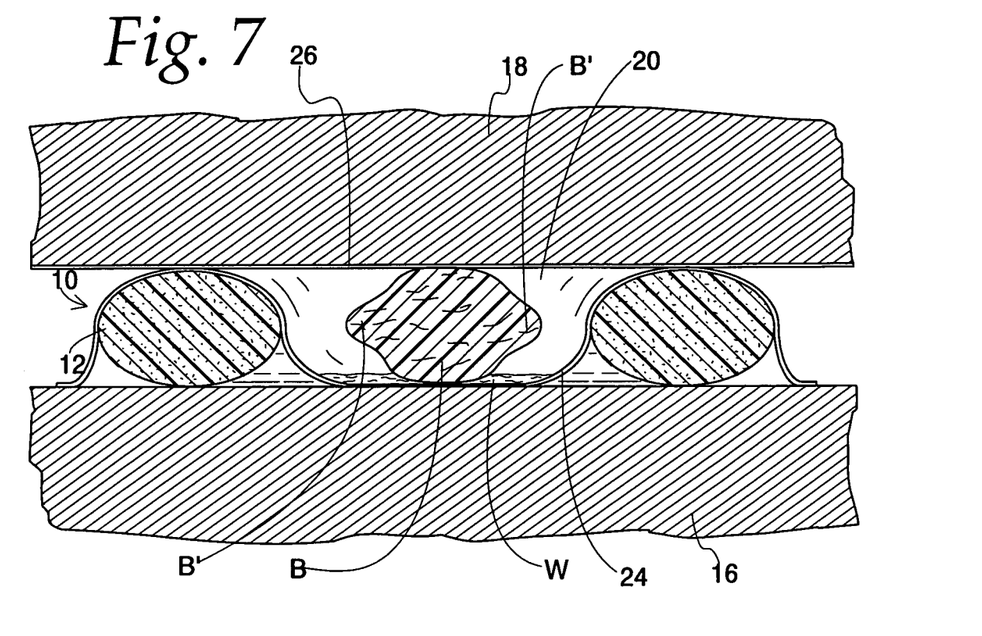
FIG. 7 is a front sectional illustration of a method of cooking a chicken breast in a clamshell grill using the ring member shown in FIG. 5.

Referring to FIGS. 5-7, ring member 12 is covered by a lower release sheet 24 and an upper release sheet 26. As shown in FIG. 5, lower release sheet 24 may be laid on top of ring member 12 to line the bottom and sides of cavity 20, and chicken breast B and quantity of water W may be introduced into cavity 20. Upper release sheet 26 is preferably mounted in intimate contact with upper platen 18, as in FIG. 5, so that cavity 20 is substantially closed by release sheets 24 and 26 when upper platen 18 is lowered onto chicken ring 10. More preferably, upper release sheet 26 is mounted to upper platen 18 by a retention assembly 28, composed of nested outer and inner frames 30 and 32, respectively, and spring mechanisms 34. Spring mechanisms 34 may be attached to pins 36 on outer frame 30 and the sides of upper platen 18, thereby providing tension between nested outer and inner frames 30 and 32 and upper platen 18. Upper release sheet 26 is thus retained in intimate contact with the heated surface of upper platen 18. Alternatively, in a method not illustrated, upper release sheet 26 may be simply laid on top of chicken breast B and lower release sheet 24 to substantially close cavity 20 before clamshell grill 14 is closed.

FIG. 6 is a perspective view of clamshell grill 14 closed onto covered chicken ring 10 shown in FIG. 5.

FIG. 7 is a front sectional illustration of a method of cooking a chicken breast in clamshell grill 14 using the covered chicken ring 10 shown in FIG. 5. As in the open chicken ring cooking method, the thicker portions of chicken breast B are cooked by two-sided grilling while the thinner portions B' are simultaneously steamed by steam generated from the quantity of water W.

Figure 8:
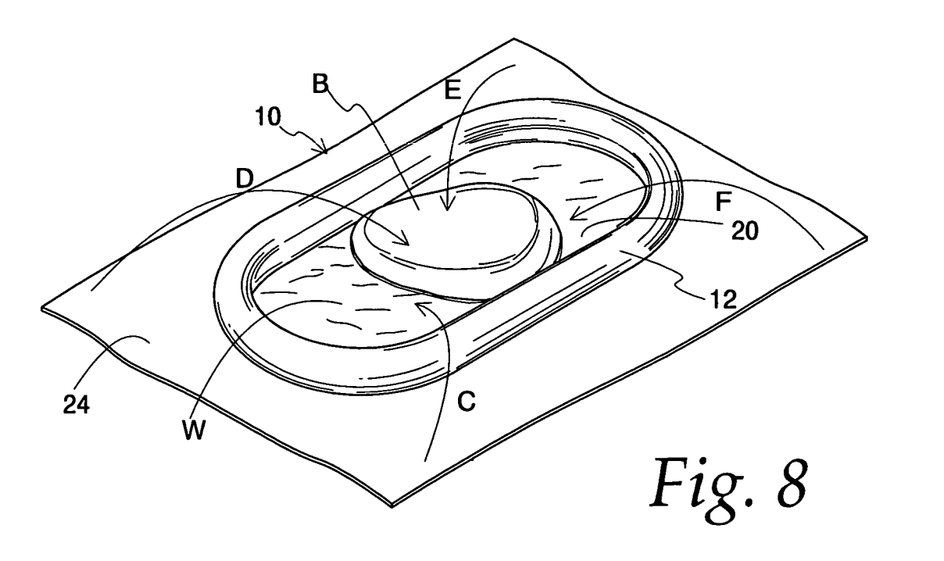
FIG. 8 is a perspective illustration of an alternative method of covering the ring member with a lower release sheet.
Figure 9:
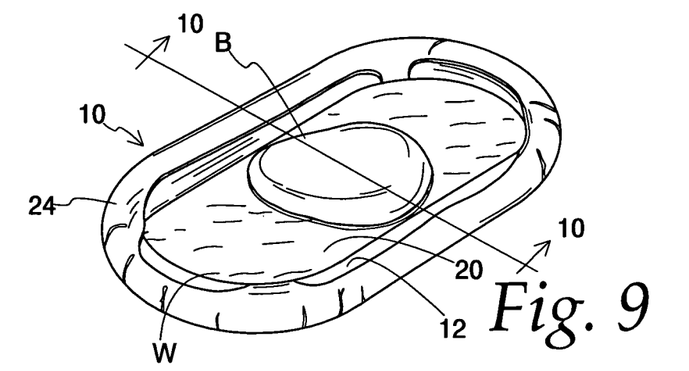
FIG. 9 is a perspective view of the covered ring member illustrated in FIG. 8.
Figure 10:
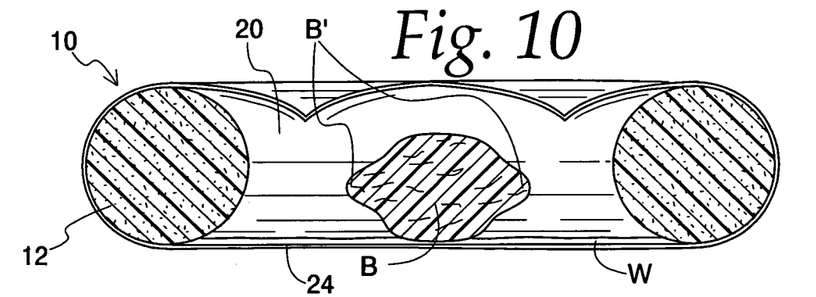
FIG. 10 is a front sectional view of the covered ring member shown in FIG. 9.
Figure 11:
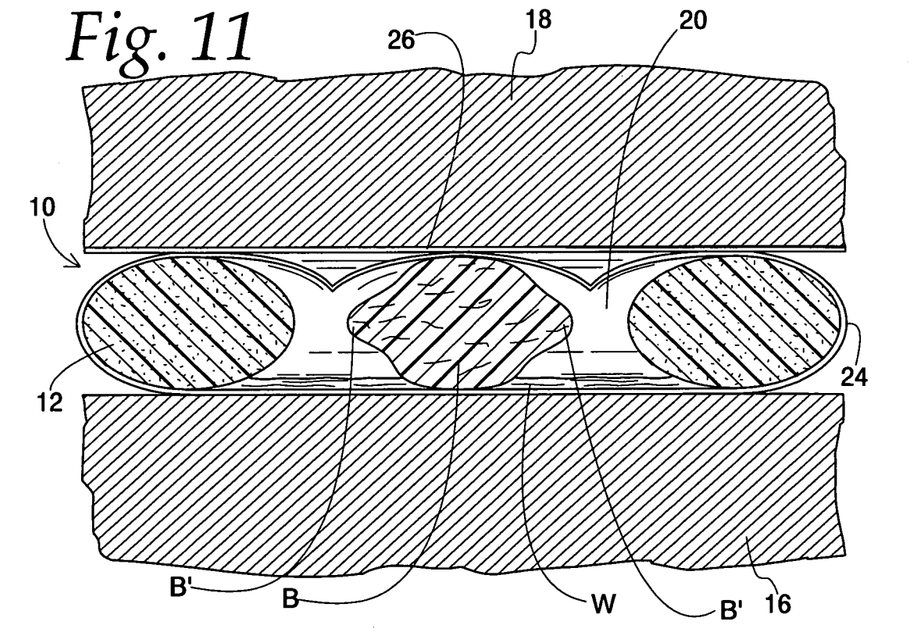
FIG. 11 is a front sectional illustration of a method of cooking a chicken breast in a clamshell grill using the covered ring member shown in FIG. 9.

FIGS. 8-11 illustrate an alternative embodiment of covered chicken ring 10. Referring to FIG. 8, ring member 12 may be laid on top of lower release sheet 24, and the edges of lower release sheet 24 may be wrapped over the outer periphery of ring member 12, as indicated by arrows C-F, to cover the bottom face and outer periphery of ring member 12. FIGS. 9-10 are perspective and front sectional views, respectively, of covered chicken ring 10 so assembled. As shown, chicken breast B and quantity of water W are introduced into cavity 20 before lower release sheet 24 is wrapped over ring member 12, but they may be introduced at any time before clamshell grill 14 is closed onto chicken ring 10. FIG. 11 is a front sectional illustration of a method of simultaneous steaming and two-sided grilling of chicken breast B between heated platens 16 and 18 using alternative covered chicken ring 10 shown in FIGS. 9-10.

Figure 12:
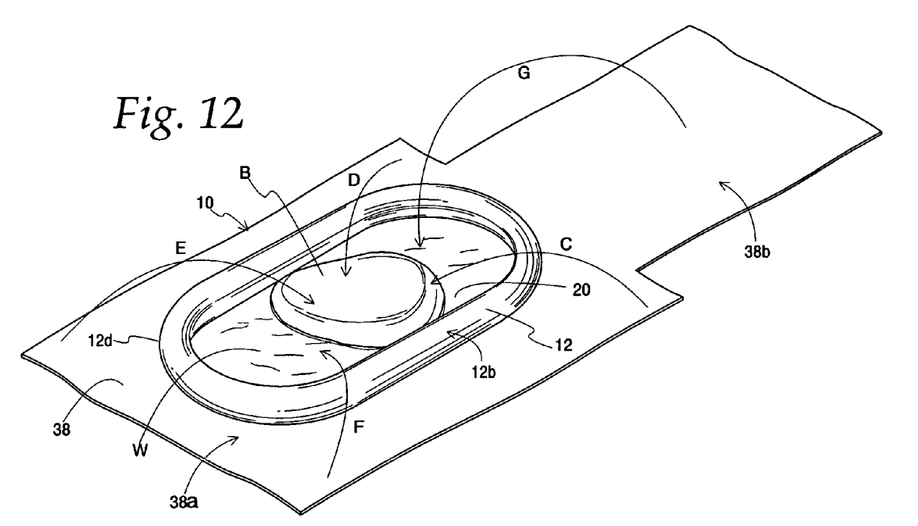
FIG. 12 is a perspective illustration of a method of covering the bottom and top of a ring member with a single release sheet.
Figure 13:
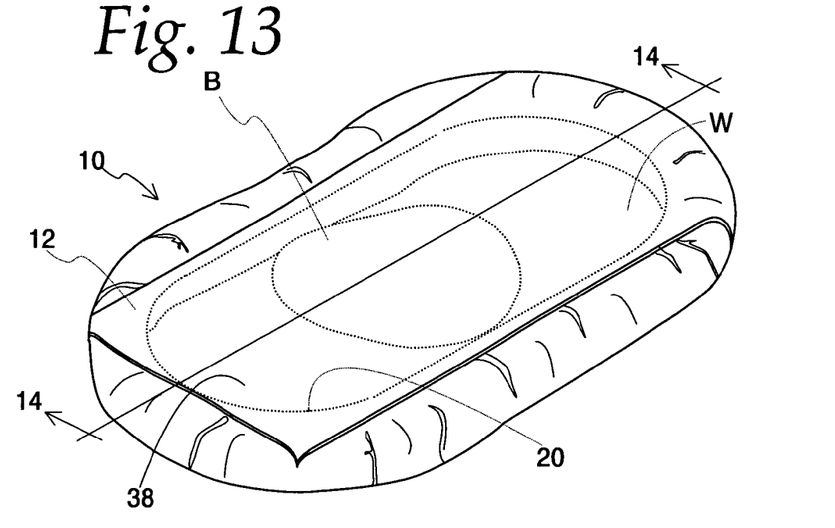
FIG. 13 is a perspective view of the covered ring member illustrated in FIG. 12.
Figure 14:
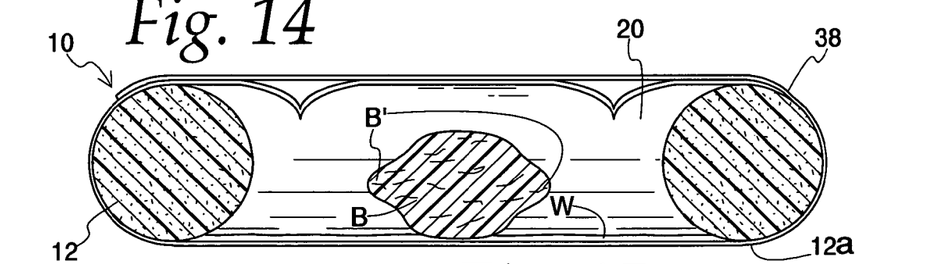
FIG. 14 is a front sectional view of the covered ring member shown in FIG. 13.
Figure 15:
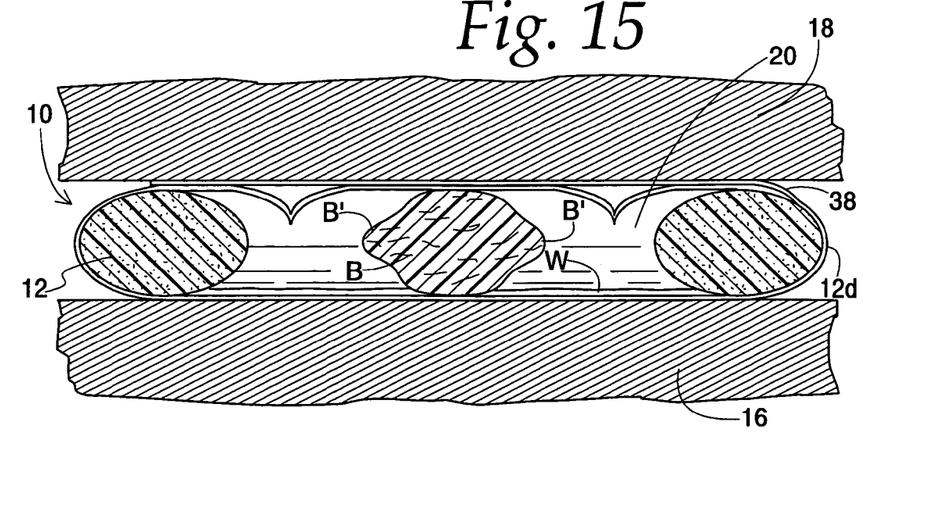
FIG. 15 is a front sectional illustration of a method of cooking a chicken breast in a clamshell grill using the covered ring member shown in FIG. 13.

Alternatively, a single release sheet may cover the bottom face 12a and top face 12b of ring member 12. Referring to FIG. 12, ring member 12 may be laid on top of a bottom portion 38a of single release sheet 38, and chicken breast B and quantity of water W may be introduced into resulting cavity 20. The bottom portion 38a of single release sheet 38 may then be wrapped over the outer periphery 12d of ring member 12 as indicated by arrows C-F, and the narrower top portion 38b of single release sheet 38 folded over top face 12b of ring member 12 as indicated by arrow G. Closed chicken ring 10 so assembled is shown in FIG. 13 in a perspective view, and in FIG. 14 in a front sectional view. FIG. 15 is a front sectional illustration of a method of simultaneous steaming and two-sided grilling of chicken breast B between heated platens 16 and 18 using closed chicken ring 10 shown in FIGS. 13-14. As shown, single release sheet 38 is "tailored" to cover ring member 12, having a wider bottom portion 38a for covering the bottom 12a and outer periphery 12d of ring member 12, and a narrower top portion 38b for covering the top of ring member 12. However, the skilled practitioner will understand that rectangular single release sheet 38 will also suffice, though it may result in increased use of material not needed to cover ring member 12.

Figure 16:
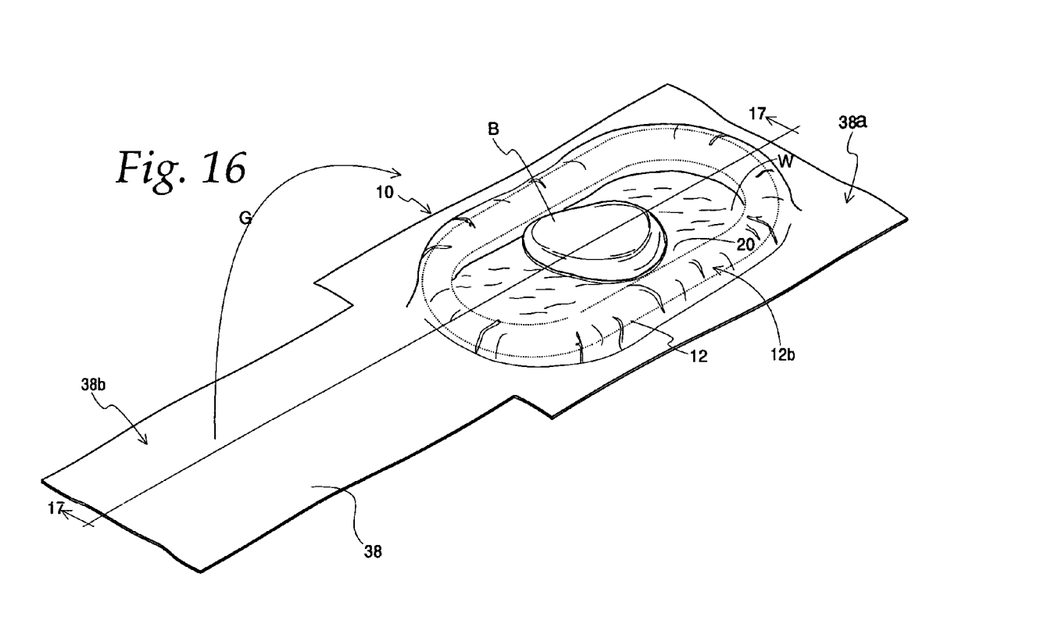
FIG. 16 is a perspective illustration of an alternative method of covering the bottom and top of a ring member with a single release sheet.
Figure 17:
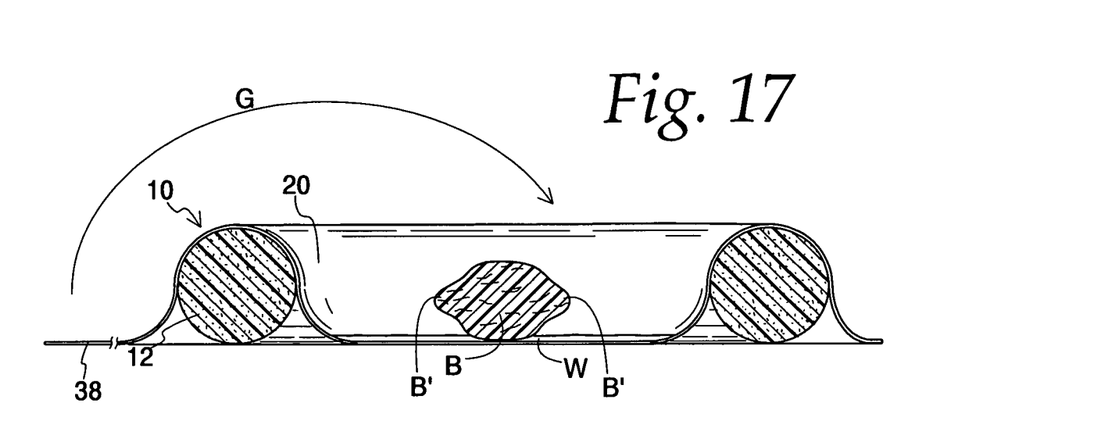
FIG. 17 is a front sectional illustration of the alternative method of covering a ring member illustrated in FIG. 16.
Figure 18:
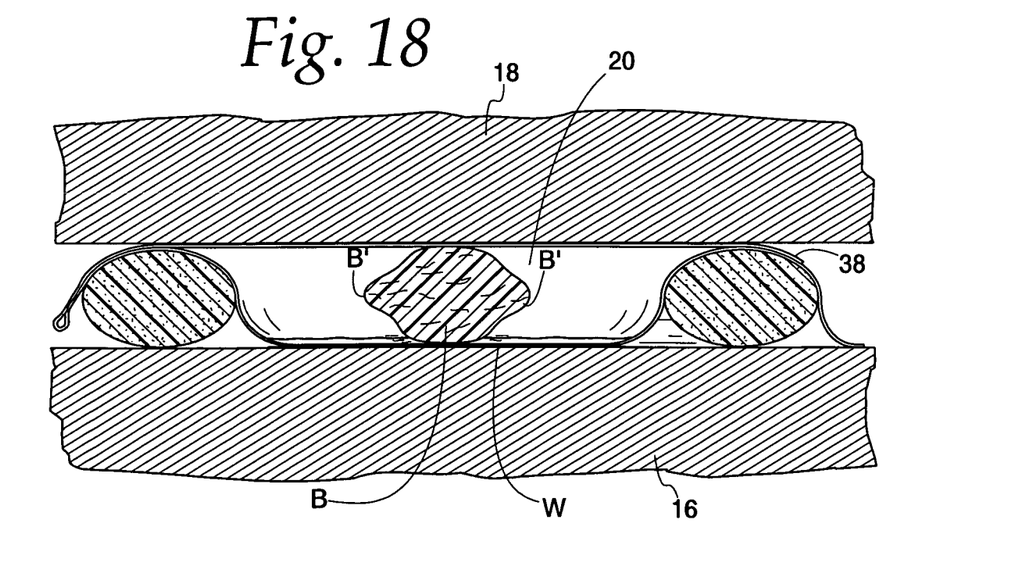
FIG. 18 is a front sectional illustration of a method of cooking a chicken breast in a clamshell grill using the covered ring member illustrated in FIGS. 16-17.

Referring to FIG. 16, an alternative method of covering bottom face 12a and top face 12b of ring member 12 with single release sheet 38 is illustrated. In this embodiment, bottom portion 38a of single release sheet 38 may be laid on top of ring member 12 to line cavity 20 defined by the inner perimeter of ring member 12, into which cavity chicken breast B and quantity of water W may be introduced. Next, the top portion 38b of single release sheet 38 may be folded to cover top face 12b of ring member 12, as indicated by arrow G. FIG. 17 is a front sectional illustration of the assembly method illustrated in FIG. 16. FIG. 18 is an illustration of a method of simultaneous steaming and two-sided grilling of chicken breast B between heated platens 16 and 18 using covered chicken ring 10 so assembled.

Release sheet material suitable for use in the present invention is flexible, non-stick, heat-resistant film material, such as pure or modified PTFE film material available from Saint-Gobain Performance Plastics Corporation ("St. Gobain"), or similar material. Preferably, the release sheet material is also a gas-permeable (i.e., permeable by gases including vapors) and liquid-impermeable material, such as dispersion-polymerized or expanded PTFE commonly known and used in industry. Although release sheet material suitable for the proposed invention is not limited to any particular initial shape, such material is typically available in the form of flat rectangular sheets. This form is well suited to upper release sheet 26 mounted to flat upper platen 18. However, when disposed in association with ring member 12 as depicted in FIGS. 1-4, lower release sheet 24 or single release sheet 38 in this form will inevitably be bunched and/or folded over itself at some portions of its area. To the extent feasible, a single or lower release sheet is preferably mounted in such a way that its bunched or folded portions are located away from the "hot" areas defined by the inner perimeter of ring member 12, through which heat flows from heated lower platen 16 or heated upper platen 18 into chicken breast B. By keeping the hot areas of the release sheet material substantially smooth and flat, intimate heat transfer contact between lower release sheet 24 and lower platen 16 or between single release sheet 38 and platens 16 and 18 is achieved where it is most desirable.

Figure 19:
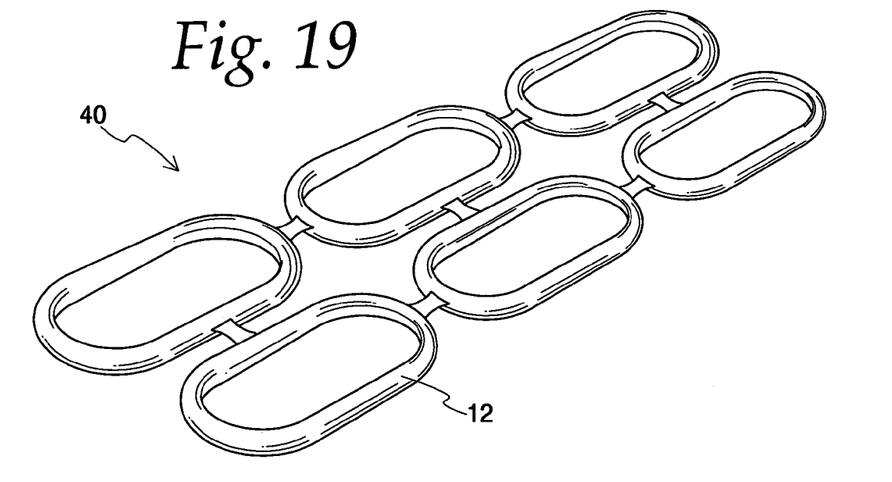
FIG. 19 is a perspective view of an array of ring members for a ring assembly in accordance with the present invention.
Figure 20A:
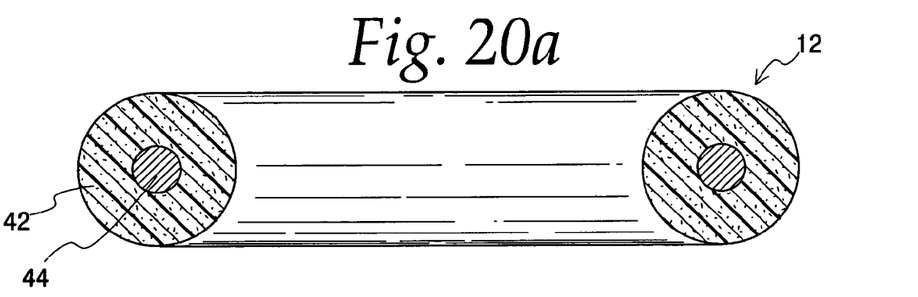
FIG. 20a is a front sectional view of an alternative embodiment of a ring member composed of a compressible tube with a metal core.
Figure 20B:
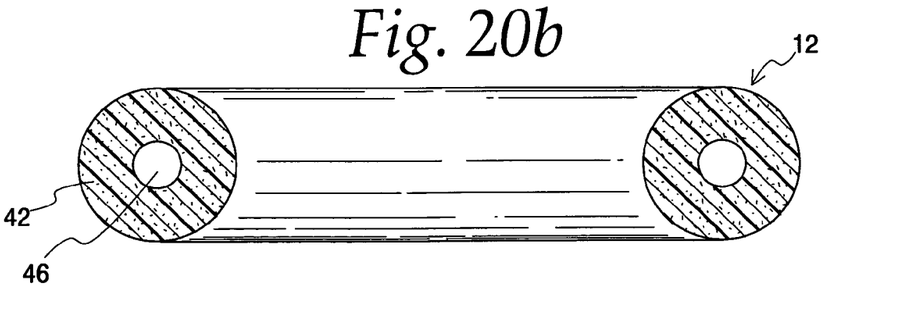
FIG. 20b is a front sectional view of an alternative embodiment of a ring member composed of a compressible tube with a hollow core.

In another embodiment, a chicken ring assembly comprises an array 40 of ring members 12, as depicted in FIG. 19. Each ring member 12 may form part of an individual chicken ring 10 as described in any of the previous embodiments. The array 40 of ring members 12 may be unitary or a modular assembly of individual ring members 12.

Figure 21A:
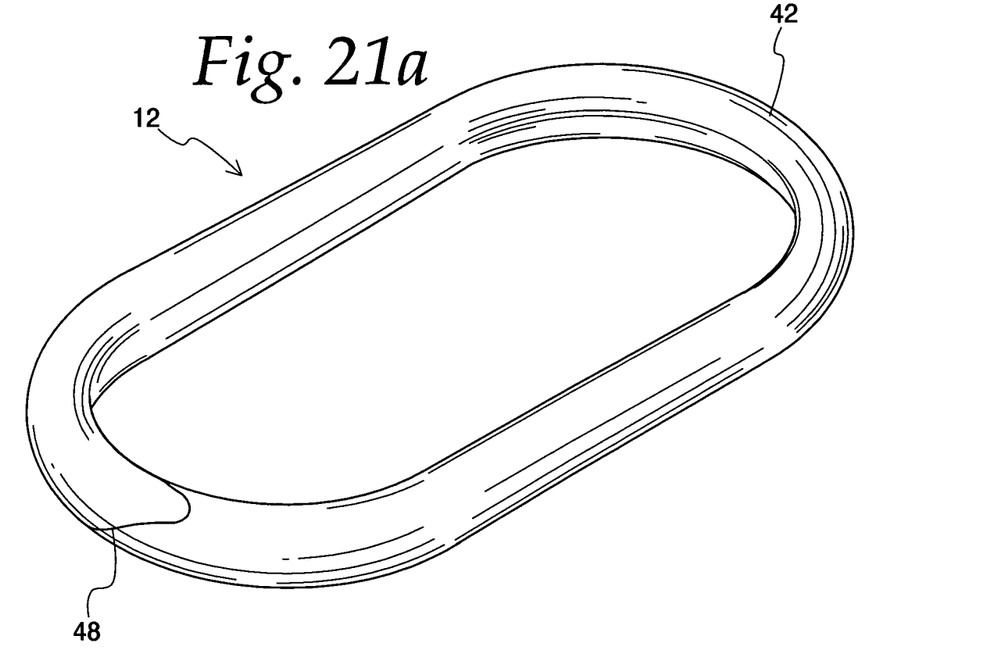
FIG. 21a is a perspective view of an alternative embodiment of a ring member having a seam.
Figure 21B:
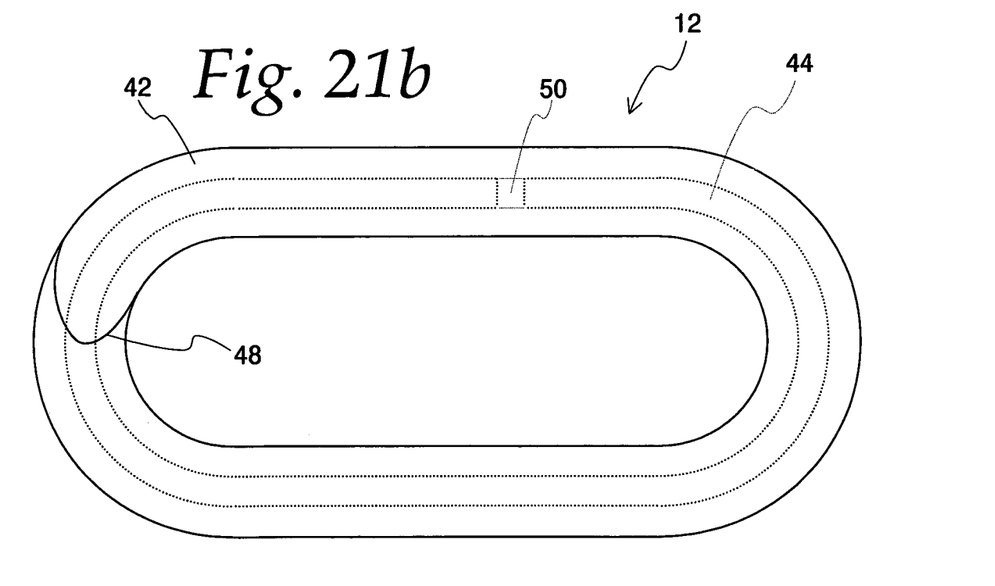
FIG. 21b is a plan view of the alternative embodiment of a ring member having a compressible tube and stiff core, wherein the compressible tube is continuous, but the stiff core is discontinuous, being interrupted by a small gap.

Ring member 12 comprises a material that is compressible, resistant to cooking temperatures such as up to about 425° F., and more preferably up to about 475° F. or higher, and preferably non-stick. Any such material can be used that provides the desired characteristics. The material may be, for example, a silicone rubber, urethane rubber, fluoropolymer or similar polymeric material. Where it is desired that ring member 12 substantially retain its shape, it may comprise a compressible tube 42 with a stiff core 44 made of metal or other sufficiently stiff material, as illustrated in cross-sectional view in FIG. 20a. Alternatively, referring to the cross-sectional view shown in FIG. 20b, ring member 12 may comprise compressible tube 42 with a hollow core 46, especially where enhanced compressibility is desired. For good steam retention during cooking, ring member 12 is preferably continuous at least at its outer periphery. It may, for example, be joined at a seam 48, as shown in perspective view in FIG. 21a. Seam 48 may be formed by the application of a suitable adhesive, heat, or any other appropriate sealing means or method. On the other hand, when ring member 12 includes metal core 44, it is not important that core 44 be continuous. For example, compressible tube 42 may be joined at seam 48, while core 44 may be a substantially closed but discontinuous loop of stiff material interrupted by a small gap 50, as indicated in FIG. 21b.

A preferred cooking method in accordance with the present invention is now described. Chicken ring 10 according to any of the previously described embodiments is laid on heated lower platen 16, chicken breast B and quantity of water W are introduced into cavity 20, and heated upper platen 18 is closed onto ring 10, creating an arrangement as depicted in any of FIG. 4, 7, 11, 15 or 18 in front sectional view. A substantial area of the top and bottom faces of chicken breast B is then heated in direct contact with the release sheet material or platen surfaces, while the sides and thinner portions of breast B' not in direct contact with the release sheet material or a platen surface are heated by steam generated from the quantity of water W, which steam is substantially retained within cavity 20. A desired amount of water is introduced before closing the upper platen by any suitable method, such as with a measuring cup, for example. Typically, the desired amount of water will be about 1/16 to 1/4 cup (0.5 to about 2 ounces) and preferably about 1/8 cup (1 fluid ounce) for a chicken breast weighing about 4 ounces with a chicken ring that has an enclosed volume when compressed and in use of about 4-5 cubic inches, or for a larger ring that accommodates four about-4-ounce chicken breasts about 18 cubic inches. By eliminating the need to turn over the chicken breast about halfway through the cooking process and by cooking both sides at once, the foregoing cooking method achieves greatly reduced cooking times over the prior art method of simultaneous steaming and one-sided cooking. More specifically, about a 40-45% reduction results by utilizing the apparatus and method in accordance with the invention with chicken breasts that are frozen when placed into the cooking apparatus.

Figure 22:
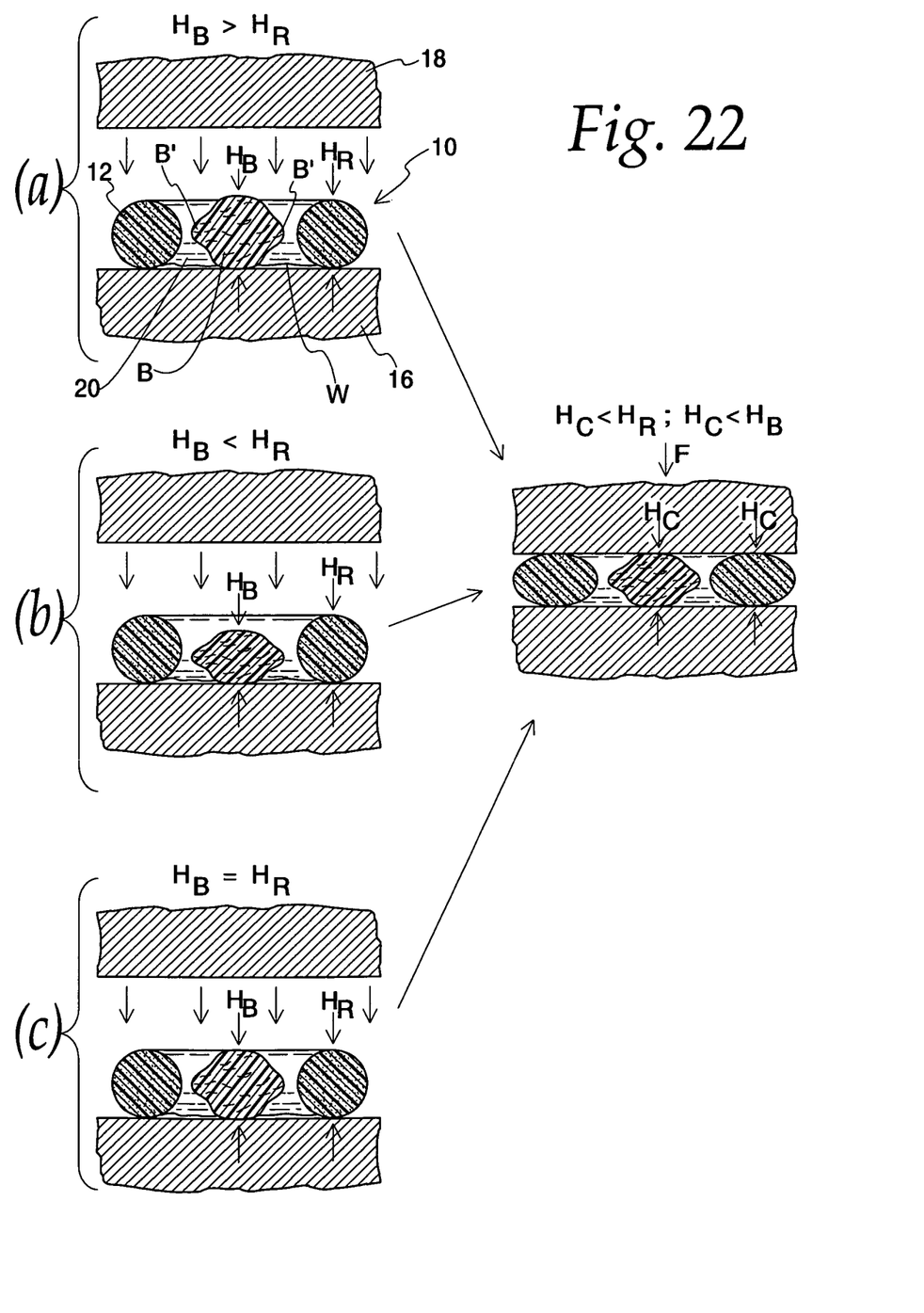
FIG. 22 is an illustration of a preferred cooking method in which both a chicken breast and ring member are compressed by a force from a heated upper platen onto a heated lower platen, whether the chicken breast is (a) taller than, (b) shorter than, or (c) the same height as the ring member.

Chicken breast B and ring member 12 may have equal or different initial heights $H_B$ and $H_R$, as illustrated by the alternative conditions (a)-(c) depicted in FIG. 22. Whether $H_B$ is initially greater than, less than, or equal to $H_R$, a force F from upper platen 18 preferably compresses both chicken breast B and ring member 12 to the same compressed height $H_C$. The term "compressed height" is used herein to refer to the height of an object subjected to pressure from an upper platen, whether or not the height of the object actually decreases when subjected to the pressure. In some embodiments the force may be solely provided by the passive weight of the platen, while in other embodiments an applied force may be provided, such as from a hydraulic mechanism. Compression of ring member 12 is desirable because it improves the seal between ring member 12 and the release sheet material or platen, thereby improving steam retention within cavity 20. Slight compression of an unfrozen chicken breast B is also desirable, as it deforms the breast to increase the area of the breast in contact with the heated platens or release sheets. Moreover, pressure on a frozen or unfrozen chicken breast improves intimate heat transfer contact at the solid-to-solid interfaces between the breast and release sheet material, between the release sheet material and heated platens, and/or between the breast and the heated platens, thereby increasing the efficiency of heat transfer to the breast from each heated platen and thus quickens thawing of the chicken breast. Where chicken breast B is initially frozen and relatively uncompressible, although not required, $H_B$ is preferably less than $H_R$ to allow ring member 12 to be immediately compressed, for more effective steam retention. An initially uncompressible frozen chicken breast B is preferably compressed gradually and slightly as it is thawed by heat from the heated platens.

While the invention has been described with respect to certain preferred embodiments, as will be appreciated by those skilled in the art, it is to be understood that the invention is capable of numerous changes, modifications and rearrangements, and such changes, modifications and rearrangements are intended to be covered by the following claims.

What is claimed is:

1. An apparatus for cooking a solid food item having a non-uniform thickness on two sides of the food item simultaneously with a two-sided grill, comprising:
   a vertically compressible, heat-resistant ring member, a two-sided grill comprising a lower platen and an upper platen, the heat-resistant ring member for being removably placed between the upper and lower platens of the two-sided grill to form a cavity sufficient to contain a food item to be cooked on the two-sided grill within an inner perimeter of the ring member and between the upper and lower platens, the cavity having a height approximately equal to an uncompressed height of the ring member, the height of the cavity contracting to a compressed height of the ring member when the ring member is compressed by the platens, the ring member being compressible to a height of about 90% or less of the uncompressed height of the ring member when the ring member is subjected to a compression force of 2 pounds per square inch, and
   a flexible, non-stick, heat-resistant thin film material separate from and for being located under the ring member to form a cavity within the inner perimeter of the ring member between the upper platen and the film material, wherein the cavity is adapted to hold water, and so that when the food item is placed within the inner perimeter of the ring member, the food item is in direct contact with the film material over the lower platen and the film material is in direct contact with the heated lower platen.

2. The apparatus of claim 1, further comprising a flexible, non-stick, heat-resistant film material located above and below and covering the ring member separate from and associated with the ring member to form a cavity within the inner perimeter of the ring member.

3. The apparatus of claim 2, wherein the film material is a single sheet and the single sheet in conjunction with the ring member defines a cavity within the inner perimeter of the ring member.

4. The apparatus of claim 2, wherein the film material comprises an upper and lower sheet.

5. The apparatus of claim 4, wherein the lower sheet lines the cavity within the inner perimeter of the ring member.

6. The apparatus of claim 4, wherein the lower sheet defines a volume in conjunction with the ring member.

7. The apparatus of claim 4, wherein the upper sheet of film material is mounted to the heated upper platen and covers the top face of the ring member.

8. The apparatus of claim 1, wherein the film material comprises PTFE, and has a thickness of about 0.0045 inches or less.

9. The apparatus of claim 1, wherein the ring member comprises a tube of compressible, heat-resistant material disposed around a rigid core member.

10. The apparatus of claim 1, wherein the ring member comprises a tube of compressible heat-resistant material with a hollow core.

11. The apparatus of claim 1, comprising an array of vertically compressible, heat-resistant ring members.

12. The apparatus of claim 1, wherein the ring member comprises a tube of compressible, heat-resistant material disposed around a core metal ring.

13. The apparatus of claim 1, the ring member being formed from a material selected from the group consisting of a silicone rubber, a urethane rubber, and a fluoropolymer.

14. The apparatus of claim 1, the ring member being resistant to cooking temperatures up to at least about 425° F.

* * * * *